US006733138B2

(12) United States Patent
Raskar

(10) Patent No.: US 6,733,138 B2
(45) Date of Patent: May 11, 2004

(54) MULTI-PROJECTOR MOSAIC WITH AUTOMATIC REGISTRATION

(75) Inventor: Ramesh Raskar, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 281 days.

(21) Appl. No.: 09/930,425

(22) Filed: Aug. 15, 2001

(65) Prior Publication Data

US 2003/0052837 A1 Mar. 20, 2003

(51) Int. Cl.$^7$ .................. G03B 21/00; G03B 21/14; G03B 2/26; G06K 9/00; G09G 3/00
(52) U.S. Cl. ................. 353/94; 353/121; 353/70; 345/32; 382/154
(58) Field of Search .................. 353/94, 69, 70, 353/121, 122; 345/32; 382/154

(56) References Cited

U.S. PATENT DOCUMENTS 5,986,668 A    11/1999   Szeliski et al. ............. 345/433
6,456,339 B1 *  9/2002   Surati et al. ................ 348/745

OTHER PUBLICATIONS

Chen, "QuickTime VR—An Image–Based Approach to Virtual Environment Navigation"; Computer Graphics Proceedings, SIGGRAPH '95, pp. 29–38, 1995.

Szeliski et al. "Creating Full View Panoramic Image Mosaics and Environment Maps"; Computer Graphics Proceedings, SIGGRAPH'97, pp. 251–258, 1997.

Raskar et al., "Multi–Projector Displays Using Camera–Based Registration"; Proceedings of IEEE Visualization, pp. 161–168, 1999.

Chen et al., "Automatic Alignment of High–Resolution Multi–Projector Displays Using an Un–Calibrated Camera"; IEEE Visualization 2000, 2000.

* cited by examiner

Primary Examiner—Rodney Fuller
Assistant Examiner—Melissa J Koval
(74) Attorney, Agent, or Firm—Dirk Brinkman; Andrew J. Curtin

(57) ABSTRACT

A method forms a mosaic image on a display surface with a multiple projectors. For each projector in turn, a registration image is projected onto the display surface so that a union of the projected registration images forms a polygon. With a camera, for each registration image in turn, a corresponding input image is acquired. A display area on the display surface enclosed by the polygon is then identified, and a single projective matrix between the display area and each input image is determined for each projector. A source image for each projector is warped according to the corresponding homography of the projector. The pixels of the warped source image are weighted according to the single projective matrix, and then the warped and weighted source images are concurrently projected directly onto the display surface to form the mosaic image.

10 Claims, 3 Drawing Sheets

100

MULTI-PROJECTOR MOSAIC WITH AUTOMATIC REGISTRATION

FIELD OF THE INVENTION

This invention relates generally to optical devices which project images on planar surface, and more particularly to projecting an arbitrary number of images to form a single mosaic displayed image.

BACKGROUND OF THE INVENTION

A photo-mosaic is a 2D array of images registered together to form one large preceved image. The images are either taken from the same viewpoint in different directions or taken from different viewpoints of a planar scene, see Szeliski et al. "Creating full view panoramic image mosaics and texture-mapped models," *Computer Graphics* (*SIGGRAPH'97*), pp. 251–258, 1997, Chen et al. "Quicktime VR—an image-based approach to virtual environment navigation," *Comp. Graph. Proc., Annual Conf. Series* (*Siggraph '95*), pp.29–38, 1995. and U.S. Pat. No. 5,986,668 "Deghosting method and apparatus for construction of image mosaics" issued to Szeliski, et al. on Nov. 16, 1999.

Large projectors arrays are popular because they offer a practical solution to the problem of generating a high-resolution and bright image. Older systems, such as video walls, typically use an array of rear-projectors with abutting image edges separated by a small but always visible gap or overlap. Newer systems use overlapping projectors with facility for precise manual electro-mechanical adjustment for image registration and blending. The setting up of these displays is still quite tedious, requiring precise projector overlap, and often a near orthogonal projection to the display surface, i.e., the display surface has to be perpendicular to the optical axis of each projector. This arguably is the most prominent drawback of large format display design.

A projector is similar to a camera in that the image projection process can be expressed using the well-known pinhole camera model. Thus far, however, projectors have received little attention in the field of computer vision.

Raskar et al. in "Multi-projector displays using camera-based registration," *IEEE Visualization*, pp. 161–68, 1999 described various approaches to building a multi-projector display system. They provided a general solution to the seamless display problem using stereo cameras to determine the display surface and individual projector's intrinsic and extrinsic parameters all in a common coordinate frame. The result was an exhaustive description of the entire display environment. Although that approach allowed for a general solution, the computational effort and resources needed to implement that approach introduced their own level of complexity.

Chen et al. in "Automatic alignment of high-resolution multi-projector displays using an UN-calibrated camera," *IEEE Visualization* 2000, 2000, provided a mechanism to reduce the problem of mechanical alignment using a camera with controllable zoom and focus, mounted on a pan-tilt unit. The data collection and computation took over thirty minutes. Surety in "Scalable Self-Calibration Display Technology for Seamless large-scale Displays," *pH Thesis*, Massachusetts Institute of Technology, 1999 presented a solution that also used a camera to establish the relative geometry of multiple projectors. The camera was calibrated by imaging a piece of paper printed with a regularly spaced grid placed in front of the display surface. Subsequently, projector imagery was registered to the grid.

It is desired to significantly reduce the support and cost for projector arrays. It is also desired to provide a flexible image registration and rendering technique that can adapt to a given projector array configuration. Furthermore, it is desired to fully automate and reduce the time required for setting up and registering multiple projectors.

SUMMARY OF THE INVENTION

The present invention provides a multi-projector display system having an arbitrary number of projectors. An automated method is provided for registering the projector array to produce a seamless single rectangular displayed image. A single camera is used to determine the pose of the projector from the relative location and orientation of each projected image. The poses of the projectors are used to register the projectors with respect to the planar display surface to achieve registration and intensity blending of the images. During operation, source images are warped so that they appear correctly as a single image when projected onto the planar display surface. The warped images are then intensity corrected to account for overlap. The corrected images can then be projected. As an advantage, the display surface can be oblique to the optical axes of the projectors.

More specifically, the invention provides a method and system for forming a mosaic image on a display surface with a multiple projectors. For each projector in turn, a registration image is projected onto the display surface so that a union of the projected registration images forms a polygon.

With a camera, for each registration image in turn, a corresponding input image is acquired. A display area on the display surface enclosed by the polygon is then identified, and a single projective matrix between the display area and each input image is determined for each projector.

A source image for each projector is warped according to the corresponding single projective matrix of the projector. The pixels of the warped source image are weighted according to the projective matrix, and then the warped and weighted source images are concurrently projected directly onto the display surface to form the mosaic image.

DETAILED DESCRIPTION OF THE PREFERRED EMBODIMENT

Definitions

In the description below, the following computer manipulated images are specifically distinguished and defined.

Registration image: an image having a predetermined structure and geometry projected onto a planar display surface. Multiple registration images are projected sequentially, one for each projector in an array of projectors.

Camera image: an image acquired by a camera of the display surface while the registration image is projected. One camera image is acquired for each registration image projected by one of the projectors.

Source image: an image that is to be projected onto the display surface to form a mosaic. Multiple source images are concurrently generated, one for each projector in an array of projectors.

Projected image: the source image after warping and blending.

Displayed Image: the user perceived appearance of multiple projected images on the display surface.

Display Area: a region of the display surface where the displayed image appears.

Multi-Projector System Overview

Figure 1:
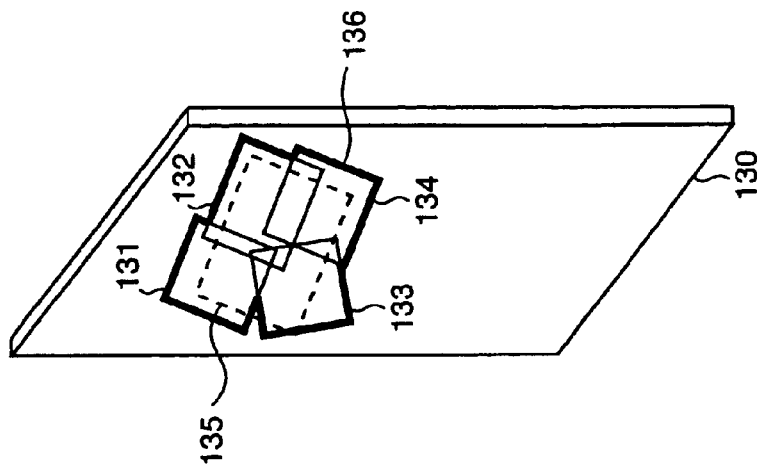
FIG. 1 is a diagram of a multi-projector display system according to the invention.
Figure 1:
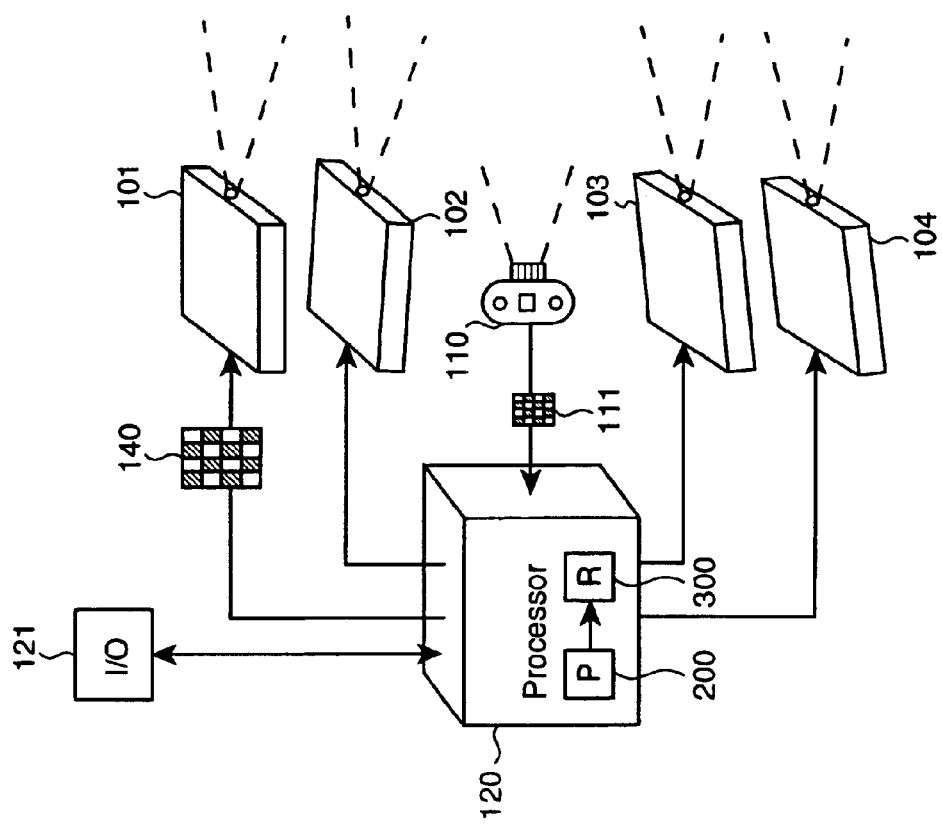

FIG. 1 shows a self-correcting multi-projector display system 100 according to our invention. The system 100 includes an array of projectors 101–104, and a camera 110 coupled to a processor 120. For example, we use four Mitsubishi Electric Corporation X-80 projectors having a resolution of 1024×768 pixels, and a single Logitech Quickcam Pro USB camera with a resolution of 640×480 pixels. The system 100 can be used in front or rear projection mode.

The projectors 101–104 can be arbitrary in number and are installed casually aimed at a planar display surface 130 so that projected images 131–134 approximately overlap. Note, it is not necessary for the images 131–134 to be aligned, or to completely overlap. Indeed, the projected images 131–134 can be key-stoned, and rotated or skewed with respect to each other, and gaps may exist between images. Furthermore, the optical axes of the projectors can be oblique to the display surface and to each other.

Here, the projectors are stacked in a 2×2 array, however other configurations are possible, For example, all the projector can be stacked vertically or aligned horizontally side-by-side. The only requirement is that the projectors generally point at the display surface 130 and generally have overlapping images in some display area 135. Similarly, the camera 110 is aimed so that its field of view covers at least the union of the images 131–134. Note, the camera is only used during a pre-processing phase 200, described in greater detail below. In the preferred embodiment, the projectors and camera are digital devices.

The processor 120 includes input/output (I/O) devices 121 for user interaction. These are standard. The processor also includes a memory storing executable programs that implement the method that control the system 100 during operation. The method that operates the system includes the pre-processing phase 200 and a rendering phase 300. These will be described in further detail below. With our self-correcting array of projectors is possible to generate a mosaic display that appears as a single displayed image of known shape, for example, a rectangle with a specific aspect ratio, even when the individual projectors of the array are arbitrarily aimed at an oblique planar surface.

Registration and Mosaic Method

Rather than carry out a full registration for the projector-camera system 100, such as determining the intrinsic parameters for both types of devices plus their relative pose, our multi-projector system 100 only uses a single projective matrix to warp a source images for each projector. The single projective matrix is a combination of a camera to projector homography, and a display area to camera homography predetermined as described below.

Pre-Processing

Figure 2:
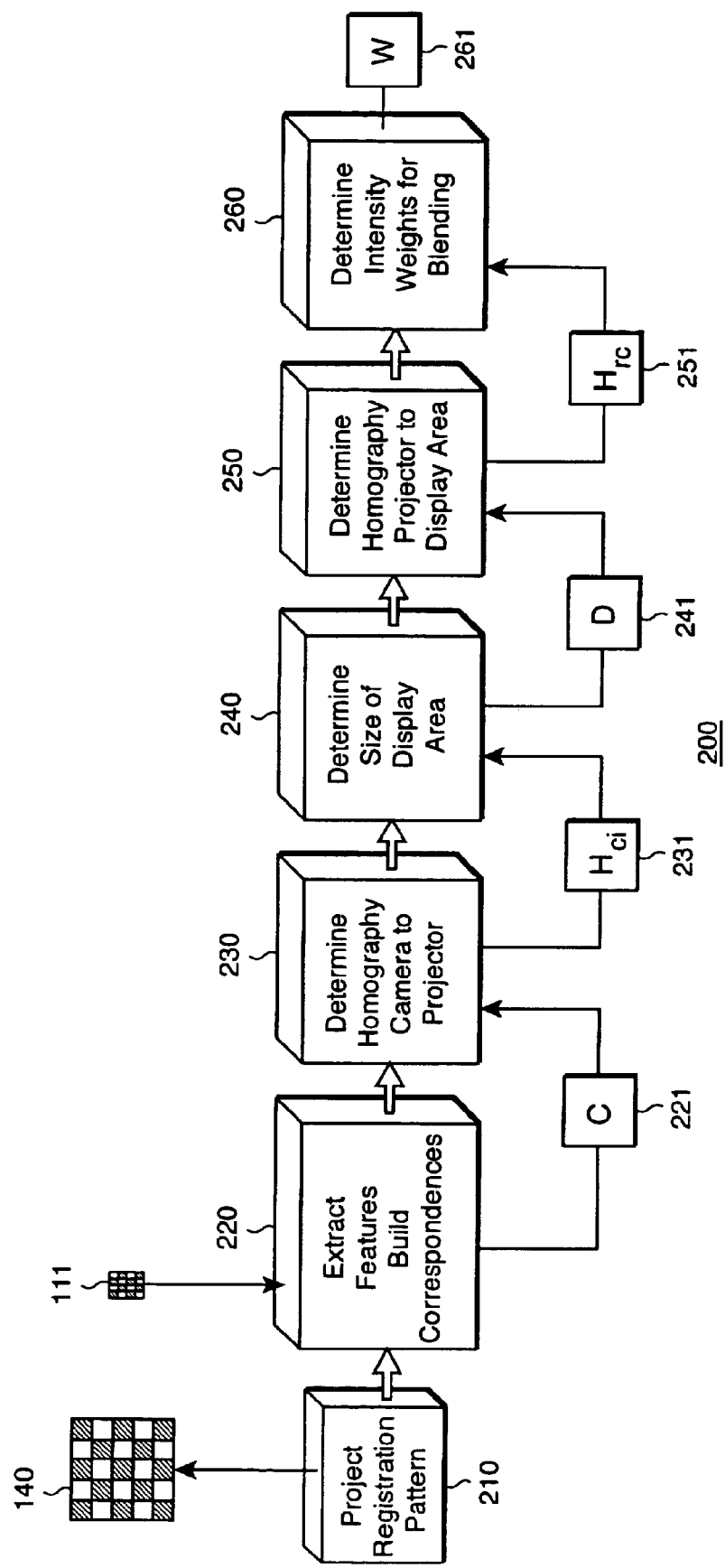
FIG. 2 is a flow diagram of a pre-processing phase of the display system of FIG. 1.

FIG. 2 shows the steps performed during pre-processing 200. The registration pattern, e.g. a checkerboard 140 is projected 210 on the display surface for each of the projectors 101–104 in turn. The correspondences (C) 221 of registration pattern features, e.g., corners or lines, are extracted from the input images 111. We use forty-eight correspondences to achieve sub-pixel registration accuracy. The correspondences 221 are used to determine a homography ($H_{ci}$) 231 between the camera and each projector i.

After the homographies for all projectors are known, the dimensions (D) 241 of the usable display area 135 is determined 240. The dimensions 241 are of the largest rectangle (or any other predefined shape) that is enclosed by the union of all of the projected images 131–134. It should be noted, that the display area can have other predetermined shapes regular or irregular, for example, circular, triangular, oval, diamond, face, etc. The shape can be defined parametrically or by a shape mask.

After the dimensions of the usable display area 135 are known, the portions of projected images that are outside the display area and that overlap other projected images can be identified. This allows us to determine 250 a homography ($H_{rc}$) 251 between the display coordinates and the camera coordinates, as well as intensity weights (W) 261 that need to be applied during the rendering phase.

Pixels that are outside the display area have a weight of zero (black), and pixels in overlapping portions have a weight in the range 0<W<1, all other pixels have a weight of one. During blending, described below, each pixel is multiplied by its corresponding weight.

Rendering

Figure 3:
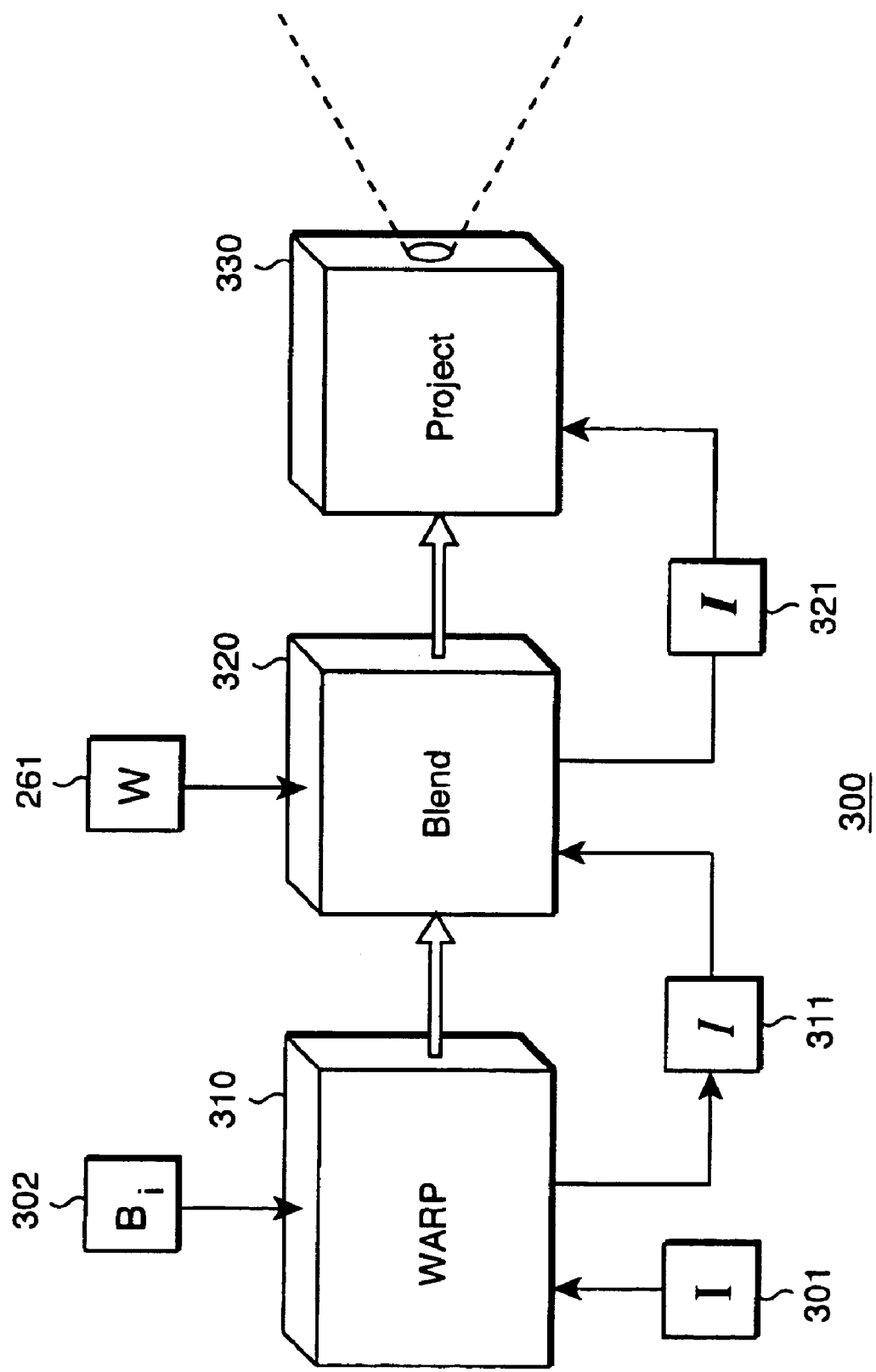
FIG. 3 is a flow diagram of a rendering phase of the display system of FIG. 1.

During rendering 300 as shown in FIG. 3, source images (I) 301 to be projected are first warped 310 according to the single projective matrix $B_i$ 302. Then, the warped image I 311 is intensity weighted during blending 320 to I 321, and projected 330 onto the display area 135. The intensity weights are on a per pixel basis. For example, the weights are stored in alpha-maps as are used by a conventional rendering engine.

Homographies

We describe how the two homographies 231 and 251 are used to define a single projective matrix $B_i$ 302 used during rendering. We assume a pin-hole camera model. If two cameras acquire two images of a 3D plane Π, then the two images are related by a homography H, defined up to scale (~=). If $m_1$ and $m_2$ are projections of a 3D location M in the plane Π, then m2~=Hm$_1$, where m1 and m2 are homogeneous coordinates, and ~= means equality up to scale.

In our multi-projector system 100, we desire to seamlessly stitch N source images from multiple projectors $P_i$, for i=1, . . . , N, into a single displayed image. In order to align the projectors with each other, we use a single camera 110 to acquire all of the N input images of the respective registration images. The projector to camera mapping, as well as a relative projector to projector mapping are then described by the above homographies due to the use of the planar display surface 130.

For notation, we choose homogeneous coordinates for both 2D camera coordinates $x_c=(x, y, 1)^T$, and for 2D projector coordinates $u_i=(u, v, 1)^T$, for i=1, . . . , N, from multiple projectors. In such a context, the N projected images map to the single input image 131 with the known homographies, $H_{c1}, H_{c2}, \ldots, H_{cN}$, satisfying $$u_i \sim= H_{ci} x_c, \text{ for } i=1, \ldots, N \qquad (1)$$

In the displayed image, the projected images 131–134 are clipped to a known shape. The coordinates of the displayed image inside this shape, which are equivalent to the coordinates of the projected images, are denoted by $x_r=(x, y, 1)^T$.

The relationship between the display coordinates and the camera coordinates can be described by a second 2D projective matrix $H_{rc}$. Therefore, we have $$u_i \sim= H_{ci} x_c \sim= (H_{ci} H_{rc}) x_r, \text{ for } i=1, \ldots, N. \qquad (2)$$

For simplicity of illustration, we define a set of homographies:

$$H_{rj} = H_{cj} H_{rc}, \text{ for } j=1, \ldots, N,$$

which specify directly the geometrical relationship between each projector and the displayed image. Then, the pixel mapping between two arbitrary projected images is $$u_j = H_{rj}H_{ri}^{-1}u_i, \qquad (3)$$

where $u_i$ and $u_j$ denote the corresponding pixels in the source images of projector $P_i$ and $P_j$ respectively.

Registration

To generate a seamless displayed image, we ensure that the projected images are registered with each other, and that the intensities across overlap region appear to transition smoothly. We first describe the technique used to register the multiple projectors 101–104 with the single camera 110, and then we describe the smooth intensity blending 320.

In this subsection, we describe a process for determining the relationship between projected pixels. This relationship is implicitly used during rendering 300 to ensure that the projected images are properly registered by warping the source images 301. For a projected mosaic, we do not explicitly calibrate either camera or the projectors, as in the prior art, in order to seamlessly stitch the projected images. Instead, the homographies between multiple projectors and the static camera are sufficient to correctly align the multiple projected images. In other words, we do need to a calibration of the optics to determine intrinsic and extrinsic parameters, as in the prior art. Instead, we rely only on the various homographies.

To register the projectors 101–104 with the camera 110, we first project 210 the registration pattern 140 onto the display surface 130 with each of the projectors 101–104 in turn, and acquire the corresponding input images 111. By extracting the feature from the 2D input images 111 corresponding to known 2D features in the registration pattern, we can determine the homography between the camera and each projector based on (1).

More formally, the homography 231 between the camera 110 and a given projector can be formulated as maximum likelihood estimation problem. Given n corresponding features between the input image x, and the registration image u, the maximum likelihood estimate can be obtained by minimizing a cost function $$\sum_{i=1}^{n} \|u_j - H_j x_j\|, \qquad (4)$$

where H is the homography from the camera to the projector, up to a scale. With four or more correspondences between the camera image and the registration image, the eight unknown parameters of H are determined using a least-squares method. More sophisticated techniques can improve robustness to noise, or outliers. In any case, the registration is done automatically. Furthermore, as described above, the relative mapping between any two projectors can be determined by combining Equation (3) and (4). Note, again an explicit calibration is not needed.

In order to form the displayed image 135, we find the maximum size shape, e.g., rectangle, that is enclosed by the union of images that would concurrently be projected by all of the projectors. This problem can be formulated as a constrained linear optimization problem.

The illuminated quadrilaterals 131–134 are specified in the coordinate system of the camera 110. We want to find, e.g., a largest axis aligned rectangle of a given aspect ratio enclosed by the union of N quadrilaterals. The union is a polygon L 136 marked in FIG. 1 with heavy edges. We assume that at least one vertex of the largest rectangle lies on an edge of the polygon L. Because, the aspect ratio is fixed, the rectangle has three degrees of freedom, position of one of the vertex in 2D, and scale of the rectangle. Therefore, we discrete the edges of the polygon L 136, and solve for the largest rectangle by testing for each possible position of the rectangle vertex resting on edges of L and each possible scale. The test checks whether the rectangle edges intersect the edges of the polygon L. After we find the near optimal inscribed rectangle, we update the homography from the display coordinate system to projector pixels using Equation (2).

It is also possible to build a scalable multi-projector system 100 by adding more projectors, even if the single camera 110 cannot view all the projected images. The only requirement is to define the relationship between any one projector and corresponding coordinates of the displayed image 135. In the preferred embodiment, the inscribed rectangle in the viewing camera defines the relationship. But, any mapping between one or more cameras and display coordinates in an Euclidean framework can be used. Hence, even if a single camera does not view all the projections, it is easy to propagate the relationship $(H_{rj}H^{-1}_{ri})$, between neighboring projectors i and j, as long as any one single camera can view both the projections.

Rendering

The displayed image 135 are rendered 300 as a scaled and seamless version of multiple projected images 321 even under oblique projection due to individual casually installed projectors. As shown in FIG. 3, we first warp each source image 301 to be projected according to the projective matrix 302 so that when it is projected onto the display surface 130 all of the warped images appear aligned inside the display area 135. Each warped image 311 is then blended by the weights 361 to produce the projected image 321, which is fed to one of the projectors 101–104.

Warping Using Homography

The warping required for the projected image is defined by the projective matrix that transformas pixel coordinates of the projected images to pixel coordinates of the desired displayed image. As described above, th projective matrix 302 is is determined, during the pre-processing. At each projector, the rendering process independently warps each source image 301.

The source image 301 is loaded in a texture memory of the projector. We then texture map a unit rectangle in the x-y plane, i.e., with extents [0:1, 0:1]. Because $x_i = H_{ri}u_r$, for projector i, we use the single projective matrix $$B_i = H_{ri}[1|0], \qquad (5)$$

where [1|0] converts a 3×3 matrix to a 4×4 matrix by an identity matrix padded out with zero vectors, see equation 6 below.

To be precise, we use an orthographic projection matrix, which is multiplied by $H_{ri}$. The pixels in regions outside display coordinates [0:1, 0:1] also appear in the projector frame buffer. This corresponds to the region outside the display area but enclosed by the polygon L 136, i.e., the union of N illuminated quadrilaterals.

We keep the background color (zero weight) black to avoid contributing to this region. The projective matrix is converted into a 4×4 matrix as used in a conventional graphics pipeline by simply adding a row and a column for depth buffer calculations. The resultant depth values are, of course, ignored, e.g.

$$[1 \mid 0] = \begin{bmatrix} 1 & 0 & 0 & 0 \\ 0 & 1 & 0 & 0 \\ 0 & 0 & 1 & 0 \\ 0 & 0 & 0 & 0 \end{bmatrix} \quad (6)$$

Image Intensity Blending

Regions of the display area 135 that are illuminated by multiple projectors would normally appear noticeably brighter. To make the overlap regions appear seamless, i.e., having smooth intensities, we use an intensity blending process. We generate a mask for each projector, which assign an intensity weight in the range 0.0 to 1.0 for every pixel in the projected images.

During the blending, we load the per-pixel intensity weight into an alpha channel of a second texture map. However, the colors channels are black. The same unit rectangle is rendered with this texture map modifying the intensity weights. The alpha channel acts a transparency function, multiplying the underlying intensities of the warped image 311. Thus, both operations, warping using the projective matrix and the intensity correction are achieved efficiently using 3D graphics hardware.

It should be understood that multiple projectors can overlap at the same illuminated point. For example, at the center of the display area 135 of FIG. 1, four projectors may well overlap. However, for uniform intensity, the weights of all projected pixels illuminating the same display surface point are made to add up to one.

A simple solution would illuminate a given point with only a single projector. Alternatively, each projector could contribute an equal amount, e.g., 0.5 for two projectors, or 0.25 for four. In practice, due to small errors in projector registration, perspective distortions, and non-linear barrel distortions, the projected images will not match exactly at their respective edges. In addition, over time, electromechanical vibrations disturb the positions of projectors. For any of these problems, even a misalignment of single pixel would cause an annoying line in the displayed image. Hence, there is a need to achieve a smooth transition of weights in the overlap. The intensities in the resulting superimposed images have to be reduced sensitivity to the static registration and dynamic registration error.

Our blending algorithm uses a strategy where the weights assigned to pixels near the edges is near zero. The weight for pixels in non-overlap regions is clearly one, and neighboring pixels in the overlap region are assigned weights as described below.

More specifically, to find a weight $A_m(u)$ associated with a pixel $u=(u, v, 1)$, we apply a blending technique, i.e., we weigh the pixels in the warped source image 311 proportional to its distance to an edge of the image. More precisely, the pixels are weighted proportional to their distance to a nearest "invisible" pixel, invisible being a pixel having zero weight. The projective matrices are computed with normalized projector coordinates so that the u and v coordinates vary between [0, 1]. Hence, the distance of a pixel to the closest edge in the projector $P_i$ is described by $$d_i(u)=w(u, v)\min(u, v, 1-u, 1-v) \quad (5)$$

where, $w(u, v)=1$, if $u\in[0,1]$, and $v\in[0,1]$, $=0$ otherwise.

This reduces the weights assignment problem, to a min function. Further, based on the implicit pixel correspondences across the multiple projectors, we ensure that the weight of pixels illuminating the same display surface adds up to one. The pixel weight $A_m(u)$ associated with pixel u of projector $P_m$ is evaluated as follows:

$$A_m(u)=d_m(u)/(\Sigma_i d_i(H_r H_{rm}^{-1} u)), \text{ for } i=1, \ldots N \quad (6)$$

This type of intensity blending is more stable in presence of small mis-registration errors, whether the error results in a gap between the projected images or extra overlap. As explained below, the weights are implemented using the commonly used alpha-maps for transparency in 3D graphics hardware. Last we project 330 the warped and intensity weighted image 321 in each projector to produce the displayed image.

Effect of the Invention

The invention is effective for quickly setting up a large number of digital projectors so that the combined projections appear as a single cohesive image without noticeable overlap in the images. The projectors are coupled to a processor. The user merely aims the projector in the general direction of a display surface so that individual projected images overlap or nearly overlap in some predetermined form, for example a 2×3 matrix for six projectors. Once, the projectors are approximately positions, a registration image is displayed by each projector to register the projectors with each other and the display surface. As soon as the projectors are registered they can be used to display a seamless mosaic of images. The whole process takes a couple of seconds.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for forming a mosaic image on a display surface with a plurality of projectors, comprising:

projecting, for each projector in turn, a single registration image onto the display surface so that a union of the projected registration images forms a polygon;

acquiring with a camera, for each single registration image in turn, a corresponding input image;

identifying a display area on the display surface enclosed by the polygon;

determining, for each projector, a single projective matrix between the display area and each input image, wherein the single projective matrix is a homography;

warping, for each projector, a source image according to the corresponding single projective matrix;

weighting pixels of the warped source image according to the single projective matrix; and concurrently projecting the warped and weighted source images directly onto the display surface to form the mosaic image.

2. The method of claim 1 wherein the display surface is oblique to an optical axis of at least one of the projectors.

3. The method of claim 1 wherein an optical axis of one projector is oblique to an optical axis of at least one other projector.

4. The method of claim 1 wherein an optical axis of each projector is oblique an optical axis of every other projector.

5. The method of claim 1 wherein the registration image includes a checkerboard pattern.

6. The method of claim 1 wherein the polygon encloses the display area and the display area is a largest possible rectangle that is enclosed by the polygon.

7. The method of claim 1 further comprising:
defining, for each projector, a first homography between the camera and the projector;
defining, for each projector, a second homography between the display area and the camera; and
combining the first and second homographies to form the single projective matrix.

8. The method of claim 7 wherein the first homography $H_i$ is a maximum likelihood estimation problem, and further comprising:
minimizing a cost function $$\sum_{i}^{n} \|u - Hx\|,$$

where n indicates a number of corresponding features between the input image x, and the registration image u.

9. The method of claim 1 further comprising:
assigning a zero weight to a particular pixel in each warped image if the particular pixel is outside the display area;
assigning a one weight to the particular pixel if the particular pixel is an only pixel illuminating the display area; and otherwise
assigning a weight W in a range 0<W<1 to the particular pixel, where W is proportional to a distance to a nearest pixel having a zero weight.

10. A system for forming a mosaic image on a display surface, comprising:
a plurality of projectors, each projector arranged to project a single registration image onto the display surface so that a union of the projected registration images forms a polygon;
a camera arranged to acquiring, for each single registration image in turn, a corresponding input image;
means for identifying a display area on the display surface enclosed by the polygon;
means for determining, for each projector, a single projective matrix between the display area and each input image, wherein the single projective matrix is a homography;
means for warping, for each projector, a source image according to the corresponding single projective matrix;
means for weighting pixels of each warped source image according to the single projective matrix so that projected warped and weighted source images form the mosaic image on the display surface.

* * * * *